US011351681B2

(12) United States Patent
Bai et al.

(10) Patent No.: US 11,351,681 B2
(45) Date of Patent: Jun. 7, 2022

(54) METHOD AND APPARATUS FOR CHARGING ROBOT

(71) Applicant: SHANGHAI SLAMTEC CO., LTD., Shanghai (CN)

(72) Inventors: Jing Bai, Shanghai (CN); Yuxiang Li, Shanghai (CN); Shikai Chen, Shanghai (CN)

(73) Assignee: SHANGHAI SLAMTEC CO., LTD., Shanghai (CN)

( * ) Notice: Subject to any disclaimer, the term of this patent is extended or adjusted under 35 U.S.C. 154(b) by 245 days.

(21) Appl. No.: 16/613,421

(22) PCT Filed: Mar. 23, 2018

(86) PCT No.: PCT/CN2018/080273
§ 371 (c)(1),
(2) Date: Nov. 14, 2019

(87) PCT Pub. No.: WO2018/210059
PCT Pub. Date: Nov. 22, 2018

(65) Prior Publication Data
US 2020/0164530 A1 May 28, 2020

(30) Foreign Application Priority Data
May 18, 2017 (CN) .......................... 201710350724.2

(51) Int. Cl.
*B25J 19/02* (2006.01)
*G05D 1/02* (2020.01)
(Continued)

(52) U.S. Cl.
CPC .......... *B25J 19/022* (2013.01); *B25J 9/1664* (2013.01); *B25J 19/023* (2013.01);
(Continued)

(58) Field of Classification Search
CPC .................................. B25J 19/02; G05D 1/02
See application file for complete search history.

(56) References Cited

U.S. PATENT DOCUMENTS

| 8,515,580 B2 * | 8/2013 | Taylor .................. G05D 1/0225 |
| | | 700/259 |
| 2002/0153186 A1 * | 10/2002 | Lemieux ................ B62M 27/02 |
| | | 180/186 |

(Continued)

FOREIGN PATENT DOCUMENTS

| CN | 102545275 A | * | 7/2012 |
| CN | 102545275 A | | 7/2012 |

(Continued)

*Primary Examiner* — Kira Nguyen
(74) *Attorney, Agent, or Firm* — Bayramoglu Law Offices LLC

(57) ABSTRACT

The purpose of the invention is to provide a method for charging a robot and apparatus thereof. The invention according to the environment map and robot self-positioning information which is the position and orientation of the robot in the environment map, moves the robot to a position near a potential or registered charging pile; uses acquisition apparatuses such as laser to carry out line extraction of the structural data of the identification when the robot moves to short-range pile-searching connecting area, and combines with the preset structural data of the identification template, to carry out the recognition of the charging pile, after the collected structural data of the identification and the structural data of the identification template satisfy the preset matching degree, then the charging pile can be connected to the robot for charging.

21 Claims, 3 Drawing Sheets

(51) Int. Cl.
*H02J 7/00* (2006.01)
*B25J 9/16* (2006.01)

(52) U.S. Cl.
CPC ........ *G05D 1/0225* (2013.01); *H02J 7/00038* (2020.01); *H02J 7/0045* (2013.01)

(56) References Cited

U.S. PATENT DOCUMENTS

| | | | | |
|---|---|---|---|---|
| 2004/0158357 | A1* | 8/2004 | Lee | G05D 1/0272 700/258 |
| 2011/0137461 | A1* | 6/2011 | Kong | G05D 1/0225 700/253 |
| 2011/0238214 | A1* | 9/2011 | Yoo | G05D 1/0225 700/258 |
| 2014/0100693 | A1* | 4/2014 | Fong | A47L 9/2873 700/253 |
| 2017/0177001 | A1* | 6/2017 | Cao | A47L 9/2805 |
| 2018/0246518 | A1* | 8/2018 | Vogel | G05D 1/0274 |

FOREIGN PATENT DOCUMENTS

| | | |
|---|---|---|
| CN | 103645733 A | 3/2014 |
| CN | 103901895 A | 7/2014 |
| CN | 103926925 A | 7/2014 |
| CN | 106980320 A | 7/2017 |
| DE | 2226880 B2 | 2/1976 |

\* cited by examiner

METHOD AND APPARATUS FOR CHARGING ROBOT

CROSS REFERENCE TO RELATED APPLICATIONS

This application is the national phase entry of International Application No. PCT/CN2018/080273, filed on Mar. 23, 2018, which is based upon and claims priority to Chinese Patent Application No. 201710350724.2, filed on May 18, 2017, the entire contents of which are incorporated herein by reference.

TECHNICAL FIELD

The present invention relates to a method and apparatus for charging robot.

BACKGROUND

With the development of intelligent robots, a variety of service robots have emerged, such as sweeping robots, tour guide robots, shopping guide robots, consulting robots, etc. People have higher and higher demands on functions like long-term attended operation, increasing the scope of activities, and extending the autonomous time of robots. So the supplement of power energy has become an urgent problem to be solved. Common robot power sources are cable-free and mainly rely on high-quality on-board battery packs. Therefore, autonomous recharging technology emerges at the right moment, that is, under the premise of insufficient power and without manual intervention of the robot, the robot can be guided to return to the charging connecting area remotely through some way to achieve automatic connecting and charging.

However, in the existing technical solutions, the remote returning of the robot to the charging pile takes a long time and has low efficiency. There is even the problem that before the battery capacity is exhausted, the robot is unable to find the charging pile causing excessive discharge of the battery, which results in damage to the battery or shutdown of the robot, etc. In addition, there are still some problems in the existing methods of identifying charging piles, such as sensitive hardware characteristics, which are easily disturbed by the environment and inaccurate identification.

SUMMARY

One purpose of the invention is to provide a method for robot charging and an apparatus for robot charging, which can solve the problem that the remote returning of the robot to the charging pile takes a long time and has low efficiency.

According to one aspect of the invention, a method for charging robot is provided, the method includes:

collecting the current surrounding environment data of the robot during the movement of the robot, generating the environment map of the environment where the robot is and the position and orientation of the robot in the environment map according to the surrounding environment data, and the environment map including the recorded potential charging piles positions or registered charging piles positions that have been recorded;

according to the environment map and the position and orientation of the robot in the environment map, moving the robot to the short-range pile-searching connecting area near the position of the potential charging pile or registered charging pile;

collecting the structural data of the identifications on the potential charging piles or the registered charging piles; if the matching degree between the structural data of the collected identification and the pre-stored structural data of the identification template is greater than the preset matching degree threshold, determining the position and orientation of the charging piles according to the structural data of the collected identification; and adjusting the position and orientation of the robot in the environment map according to the position and orientation of the charging pile, and connecting the charging pile to the robot for charging.

Further, in the above method, after the charging pile is connected to the robot for charging, the method also includes:

collecting the voltage of the moving robot after connecting the potential charging pile or registered charging pile to the robot; if the voltage collected does not exceed the preset voltage threshold, the short-range pile-searching connecting area shall be moved, after the moving robot moves to the short-range pile-searching connecting area, and the following steps shall be repeated until the voltage collected exceeds the preset voltage threshold;

collecting the structural data of the identifications on charging piles; if the matching degree between the structural data of the collected identification and the pre-stored structural data of the identification template is greater than the preset matching degree threshold, the position and orientation of the charging pile is determined according to the structural data of the collected identifications;

adjusting the position and orientation of the robot in the environment map according to the position and orientation of the charging pile, and connecting the charging pile to the robot for charging; and collecting the voltage of the moving robot after the charging pile connected to the robot.

Further, in the above method, the identification comprises reflective material of at least one convex structure and reflective material of at least one concave structure, and at least one convex structure is connected to at least one concave structure, wherein the depth value between the convex structure and the concave structure is greater than the preset depth threshold.

Further, in the above method, before collecting the current surrounding environment data of the robot during the movement of the robot, the method also includes:

during the movement of the robot performing the task, collecting the structural data of the passing object; if the matching degree between the structural data of the passing object and the pre-stored structural data of the identification template is greater than the preset matching degree threshold, then recoding the passing object as a position of the potential charging pile.

Further, in the above method, collecting the structural data of the identifications on potential charging piles or registered charging piles are collected; if the matching degree between the structural data of the collected identification and the pre-stored structural data of the identification template is greater than the preset matching degree threshold, then the position and orientation of the charging pile will be determined according to the structural data of the collected identification, includes:

if the number of the identifications on the potential or registered charging piles in the current short-range pile-searching connecting area is one, the robot will make a preset number of movement in the short-range pile-searching connecting area, and collecting the structural data of the potential or registered identifications on the charging piles after each movement; and calculating whether the matching degree between the structural data collected every time of identification on each potential or registered charging pile and pre-stored structural data of identification template is greater than the preset matching degree threshold, then determining whether the number of the calculated matching degree of potential or registered charging piles greater than the preset matching degree threshold is greater than the preset number, if so, then determining the position and orientation of charging pile according to the structural data of the collected identifications.

Further, in the above method, collecting the structural data of the identifications on potential or registered charging piles are collected; if the matching degree between the structural data of the collected identifications and the pre-stored structure data of the identification template is greater than the preset matching degree threshold, determining the position and orientation of the charging pile according to the structural data of the collected identifications, includes:

if the number of the identifications on potential or registered charging piles in the current short-range pile-searching connecting area is more than one, the robot will make a preset number of movement in the short-range pile-searching connecting area, and collecting the structural data of the identifications on each potential or registered charging pile after each movement; and calculating whether the matching degree between the structural data of the identifications on every potential or registered charging pile and the structural data of the identification template is greater than the preset matching degree threshold, calculating whether the number of the matching degree of every potential or registered charging pile greater than the preset matching degree threshold is greater than the preset number, then selecting the potential or registered charging piles with the largest number of the calculated matching degree greater than the preset number to be a charge pile waiting for connecting and determining the position and orientation of the charging pile according to the structural data of the collected identification on the charging pile waiting for connecting.

Further, in the above method, collecting the current surrounding environment data of the robot during the movement of the robot, includes:

collecting the current environment data of the moving robot through one of infrared, camera, ultrasonic, and laser acquisition apparatuses or any combination thereof.

Further, in the above method, collecting the structural data of the identifications on potential or registered charging piles, includes:

collecting the structural data of the identifications on potential or registered charging piles through one of infrared, depth camera, ultrasonic, and laser acquisition apparatuses or any combination thereof.

Further, in the above method, adjusting the position and orientation of the robot in the environment map is adjusted according to the position and orientation of the charging pile, and connecting the charging pile to the robot for charging, includes:

collecting the data of the moving distance and direction of the robot; and according to the position and orientation adjustment of the charging pile and the collected data of the moving distance and direction of the robot, adjusting the position and orientation of the robot in the environment map, and connecting the charging pile to the robot for charging.

Further, in the above method, according to the environment map and the position and orientation in the environment map, moving the robot to the short-range pile-searching connecting area near the position of the potential or registered charging pile, includes:

according to the current environment map, the current position and orientation of the robot in the environment map and the potential or registered charging pile position, determining the global path of the movement of the robot;

according to the global path, controlling the movement of the robot to the short-range pile-searching connecting area near the potential or registered charging pile position;

collecting the data of the current moving speed of the robot, adjusting the local path of the global path and the running speed of the local path according to the current environment map, the current position and orientation of the robot in the environment map and the current moving speed of the robot, and obtaining the smooth collision-free global path after adjustment; and according to the adjusted global path, the robot continues to move to the short-range pile-searching connecting area near the position of potential or registered charging pile.

According to another aspect of the invention, an apparatus for charging the robot is also provided, the apparatus includes:

acquisition and positioning module; the acquisition and positioning module is configured to collect the current surrounding environment data of the robot during the movement of the robot; according to the surrounding environment data, the environment map of the robot and the position and orientation of the robot in the environment map are generated; the environment map includes the recorded potential charging pile positions or registered charging pile positions;

remote returning module; the remote returning module is configured to move the robot to a short-range pile-searching connecting area near the potential charging pile position or registered charging pile position according to the environment map and the position and orientation of the robot in the environment map;

autonomous pile-searching module; the autonomous pile-searching module is configured to collect the structural data of the identifications on the potential charging piles or the registered charging piles; if the matching degree between the structural data of the collected identification and the pre-stored structural data of the identification template is greater than the preset matching degree threshold, then the position and orientation of the charging pile is determined according to the structural data of the collected identifications; and connecting module; the connecting module is configured to adjust the position and orientation of the robot in the environment map according to the position and orientation of the charging pile, and connect the charging pile to the robot for charging.

Further, in the above apparatus, the connecting module, also configured for collecting the voltage of the moving robot after the charging pile is connected to the robot. If the collected voltage is not larger than the preset voltage threshold, then after moving the position of the short-range pile-searching connecting area, after the moving robot moves to the short-range pile-searching connecting area, the autonomous pile-searching module and the connecting module execute the respective operation repeatedly until the voltage collected by the connecting module is larger than the preset voltage threshold.

Further, in the above apparatus, the identification includes reflective material of at least one convex structure and reflective material of at least one concave structure, and the least one convex structure is connected to the at least one concave structure, wherein the depth value between the convex structure and the concave structure is greater than the preset depth threshold.

Further, in the above apparatus, the acquisition and positioning module, is also configured for collecting the structural data of the passing object during the movement of the robot performing the task and before collecting the current surrounding environment data of the robot on the move. If the matching degree between the structural data of the passing object and the pre-stored structural data of the identification template is greater than the preset matching degree threshold, then the passing object is recorded as a potential charging pile position.

Further, in the above apparatus, the autonomous pile-searching module, is configured for if the number of potential or registered identifications on the charging piles in the current short-range pile-searching connecting area is one, the robot will make a preset number of movement in the short-range pile-searching connecting area, and collect the structural data of the potential or registered identifications on the charging piles after each movement; calculate whether the matching degree between the structural data collected each time of the identification on a potential charging pile or registered charging pile and pre-stored structural data of the identification template is greater than the preset matching degree threshold, then determine whether the number of the calculated matching degree of the potential or registered charging piles greater than the preset matching degree threshold is greater than the preset number, if so, then the position and orientation of the charging pile is determined according to the structural data of the collected identification.

Further, in the above apparatus, the autonomous pile-searching module, is configured for if the number of identifications on potential charging piles, if registered charging piles in the current short-range pile-searching connecting area is more than one, the robot will make a preset number of movement in the short-range pile-searching connecting area, and collect the structural data of the identifications on each of the potential charging piles or the registered charging piles after each movement; and calculate whether the matching degree between the structural data of the identification on every potential charging piles or registered charging pile and the structural data of the identification template is greater than the preset matching degree threshold, calculate whether the number of the matching degree of each and every potential charging pile or registered charging pile is greater than the preset matching degree threshold is greater than the preset number, then select the potential charging pile or the registered charging pile that the number is the largest; and is greater than the preset number of the matching degree greater than the preset matching degree threshold to be the charging pile waiting for connecting. The position and orientation of the charging pile is determined according to the structural data of the collected identification on the charging pile waiting for connecting.

Further, in the above apparatus, the acquisition and positioning module is configured to collect the current environment data of the moving robot through one of infrared, camera, ultrasonic and laser acquisition apparatuses or any combination thereof.

Further, in the above apparatus, the autonomous pile-searching module is configured to collect the structural data of the identifications on potential charging piles or registered charging piles through one of infrared, depth camera, ultrasonic and laser acquisition apparatuses or any combination thereof.

Further, in the above apparatus, the connecting module is configured to collect the data of the moving distance and direction of the robot; according to the position and orientation adjustment of the charging pile and the collected data of the moving distance and direction of the robot, the position and orientation of the robot in the environment map is adjusted, and the charging pile is connected to the robot for charging.

Further, in the above apparatus, the remote returning module is configured to determine the global path of the movement of the robot according to the current environment map, the current position and orientation in the environment map and the potential or registered charging pile position; control the robot moves to the connecting area of the short-range searching pile near the potential charging pile position or registered charging pile position according to the global path; collect the data of the current moving speed of the robot, adjust the local path of the global path and the running speed of the local path according to the current environment map, the current position and orientation in the environment map and the current moving speed of the robot, obtain the smooth collision-free global path after adjustment; the robot continues to move to the short-range pile-searching connecting area near the position of the potential or registered charging pile according to the adjusted global path.

According to another aspect of the invention, a computing-based device is also provided. The device includes:
a processor; and
a memory arranged to store computer executable instructions, when the executable instructions being executed, the processor:

collects the current surrounding environment data of the robot during the movement of the robot, generates the environment map of the environment wherein the robot is and the position and orientation of the robot in the environment map according to the surrounding environment data, and the environment map includes the recorded potential charging piles positions or registered charging piles positions;

according to the environment map and the position and orientation of the robot in the environment map, move the robot to the short-range pile-searching connecting area near the position of potential charging pile or registered charging pile;

collects the structural data of the identifications on the potential charging piles or registered charging piles. If the matching degree between the structural data of the collected identification and the pre-stored structural data of the identification template is greater than the preset matching degree threshold, and determines the position and orientation of the charging piles according to the structural data of the collected identification; and adjusts the position and orientation of the robot in the environment map according to the position and orientation of the charging pile, and the charging pile is connected to the robot for charging.

Compared with the existing technology, the present invention moves the robot to the position near a potential charging pile or registered charging pile according to the environment map and robot self-positioning information which is the position and orientation of the robot in the environment map, avoid finding walls blindly, random walk for finding charging pile, avoid the long returning time caused by complex indoor environment, and does not need to have a certain ability to distinguish walls and island barriers, to speed up the recharging efficiency. When the robot moves to short-range pile-searching connecting area, the present invention can use acquisition apparatuses such as laser to carry out line extraction of the structural data of the identification, and combine with the preset structural data of the identification template, to carry out the recognition of the charging pile; after the structural data of the collected identification and the structural data of the identification template satisfy the preset matching degree, then the charging pile can be connected to the robot for charging; confirm the physical connection according to the voltage condition after the robot is connected to the charging pile to ensure correct charging behavior. The invention can realize accurate recognition of charging piles, is highly efficient and reliable, and can effectively overcome a series of behaviors of pile jitter, interference and misrecognition caused by sensitive hardware characteristics and environmental interference in existing technologies.

BRIEF DESCRIPTION OF THE DRAWINGS

Other features, purposes and advantages of the invention will become more apparent by reading the detailed description of a non-restrictive embodiment referring to the figures as illustrated below.

The same or similar reference signs in the attached drawing represent the same or similar parts.

DETAILED DESCRIPTION OF THE EMBODIMENTS

The invention is further described in detail below in combination with the attached drawings.

In a typical configuration of the present application terminals, service network devices, and trusted parties respectively includes one or more processors (CPU), input/output interfaces, network interfaces, and memories.

Memory may include non-permanent memory in a computer readable medium, random access memory (RAM) and/or non-volatile memory such as read-only memory (ROM) or flash RAM. Memory is an example of a computer readable medium.

Computer readable media, including permanent and non-permanent, movable and non-movable media, can store information by any method or technology. Information can be computer-readable instructions, data structures, modules of programs, or other data. Examples of computer storage media include, but are not limited to, phase change memory (PRAM), static random access memory (SRAM) and dynamic random access memory (DRAM), and other types of random access memory (RAM), read-only memory (ROM), electrically erasable programmable read only memory (EEPROM), flash memory or other memory technology, CD read-only memory (CD-ROM), digital video disc (DVD) or other optical storage, magnetic tape cassette, magnetic tape disk storage or other magnetic storage device or any other non-transmission medium used to store information that can be accessed by a computing device.

Figure 1:
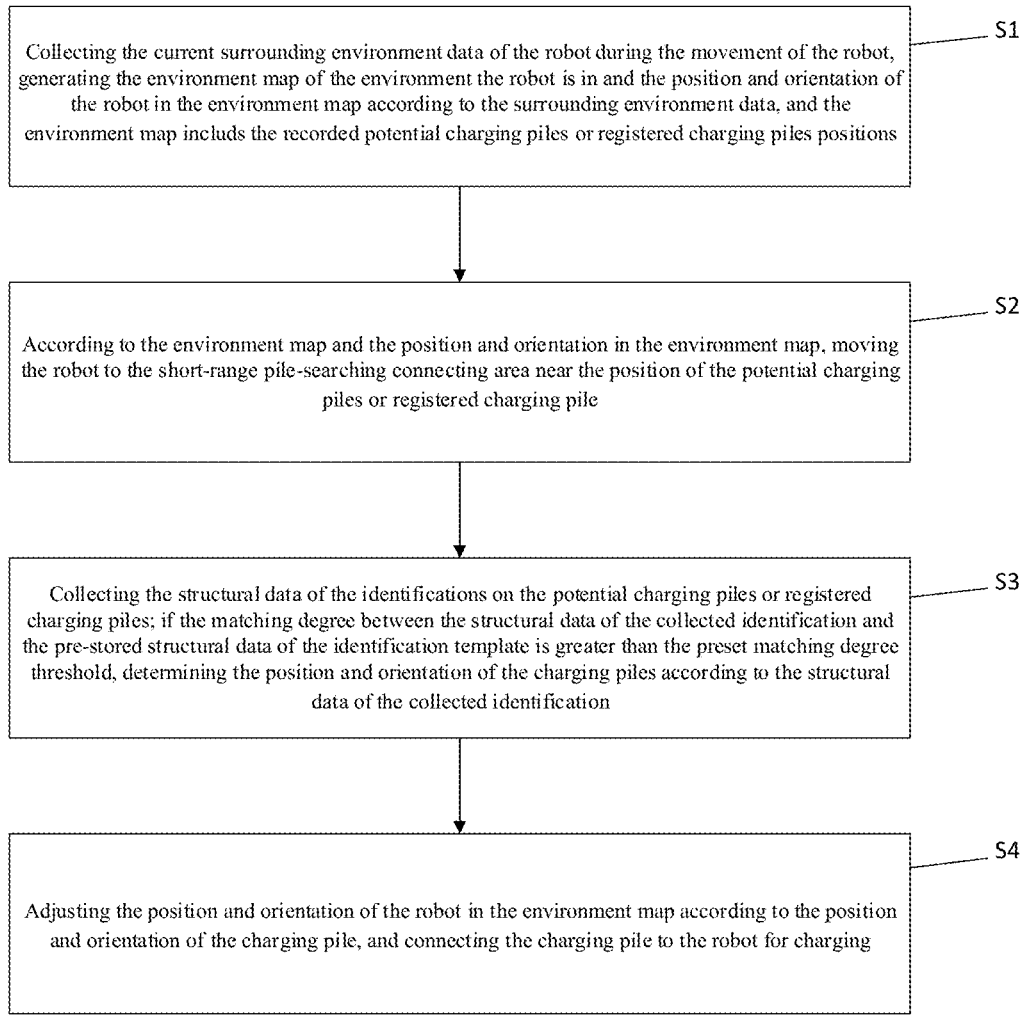
FIG. 1 is a flow chart of the method for charging a robot according to an embodiment of the invention.

As shown in FIG. 1, the present invention provides a method for charging a robot, the method includes:

step S1, collect the current surrounding environment data of the robot during the movement of the robot, generate the environment map of the environment where the robot is and the position and orientation of the robot in the environment map according to the surrounding environment data, and the environment map includes the recorded potential charging piles positions or registered charging piles positions; herein, this step constantly repeated in the whole process from the robot starts moving to connect to the charging pile successfully and stop moving, the environment map and the robot in the environment map constantly changing and updating with the movement of the robot, the recorded potential charging pile position is possibly the real charging pile position, or may not be the real charging pile position, the registered charging pile position is the real charging pile position;

step S2, according to the environment map and the position and orientation of the robot in the environment map, move the robot to the short-range pile-searching connecting area near the position of the potential or registered charging pile;

step S3, the structural data of the identifications on potential charging piles or registered charging piles are collected; if the matching degree between the structural data of the collected identification and the pre-stored structural data of the identification template is greater than the preset matching degree threshold, the position and orientation of the charging piles is determined according to the structural data of the collected identification; and step S4, the position and orientation of the robot in the environment map is adjusted according to the position and orientation of the charging pile, and the charging pile is connected to the robot for charging.

Specifically, the invention is divided into three processes: remote returning, short-range charging pile recognition and connecting charging.

Remote returning is mainly according to the environment map and robot self-positioning information which is the position and orientation of the robot in the environment map, moves the robot to a position near a potential charging pile or registered charging pile, avoids finding walls blindly, random walk for finding charging pile, avoid the long returning time caused by the complex indoor environment, and does not need to have a certain ability to distinguish walls and island barriers, to speed up the recharging efficiency.

Short-range charging pile recognition and connecting charging mainly uses acquisition apparatuses such as laser to carry out line extraction of the structural data of the identification when the robot moves to short-range pile-searching connecting area, and combine with the preset structural data of the identification template, to carry out the recognition of the charging pile; after the structural data of the collected identification and the structural data of the identification template satisfy the preset matching degree, then the charging pile can be connected to the robot for charging.

In step S4 of the embodiment of the method for charging robot according to the present invention, after the charging pile is connected to the robot for charging, the method also includes:

collecting the voltage of the moving robot after the potential or registered charging pile connecting to the robot; if the voltage collected does not exceed the preset voltage threshold, the short-range pile-searching connecting area shall be moved, after the moving robot moves to the short-range pile-searching connecting area, and the following steps shall be repeated until the voltage collected exceeds the preset voltage threshold;

collecting the structural data of the identifications on charging piles; if the matching degree between the structural data of the collected identification and the pre-stored structural data of the identification template is greater than the preset matching degree threshold, the position and orientation of the charging pile can be determined according to the structural data of the collected identifications;

adjusting the position and orientation of the robot in the environment map according to the position and orientation of the charging pile, and the charging pile is connected to the robot for charging; and collecting the voltage of the moving robot after the charging pile is connected to the robot.

In this embodiment, the physical connection is confirmed according to the voltage situation after the robot is connected to the charging pile. If the robot and the charging pile are not properly connected, then the robot is reconnected to the charging pile to ensure correct charging behavior.

In another embodiment of the method for charging the robot according to the present invention, the identification includes reflective material of at least one convex structure and reflective material of at least one concave structure, and the one convex structure is connected to the at least one concave structure, wherein the depth value between the convex structure and the concave structure is greater than the preset depth threshold.

Figure 2:
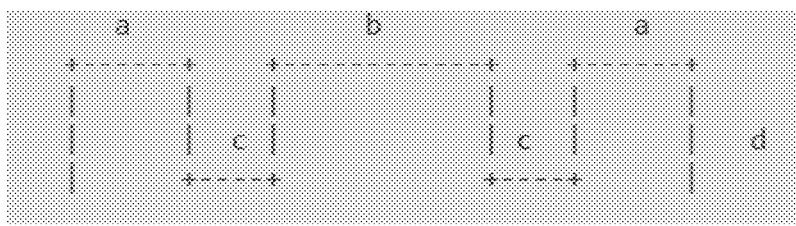
FIG. 2 is a schematic diagram of an identification of a charging pile according to an embodiment of the invention.

Herein, the convex structure and the concave structure are combined to generate an identification, and the depth value between the convex structure and the concave structure is greater than a preset depth threshold, which can effectively distinguish the identification from other objects in the environment, and avoid misrecognition. For example, the identification as shown in FIG. 2 includes three convex structures a, b, a and two concave structures c, c, a, c, b, c, a, which are sequentially connected to form the identification.

In step S1 of the embodiment of the method for charging robot according to the present invention, before collecting the current surrounding environment data of the robot during the movement of the robot, the method also includes:

during the movement of the robot performing the task, the structural data of the passing object are collected; if the matching degree between the structural data of the passing object and the pre-stored structural data of the identification template is greater than the preset matching degree threshold, then the passing object is recorded as a potential charging pile position.

Herein, the execution task refers to the own work task performed by the robot, for example, the sweeping robot performs a sweeping task, the tour guide robot performs a tour guide task, and so on. In this embodiment, by collecting the structural data of the passing object during the movement of the robot to perform the task, the potential charging pile position can be continuously supplemented and updated.

In step S3 of the embodiment of the method of charging robot according to the present invention, the structural data of the identifications on potential charging piles or registered charging piles are collected. If the matching degree between the structural data of the collected identification and the pre-stored structural data of the identification template is greater than the preset matching degree threshold, then determining the position and orientation of the charging pile will according to the structural data of the collected identification, includes:

if the number of potential or registered identifications on the charging piles in the current short-range pile-searching connecting area is one, the robot will make a preset number of movement in the short-range pile-searching connecting area, and collect the structural data of the potential or registered identifications on the charging piles after each movement;

calculate whether the matching degree between the collected structural data every time of identification on each potential charging pile or registered charging pile and pre-stored structural data of identification template is greater than the preset matching degree threshold, then determine whether the number of the calculated matching degree of potential or registered charging piles greater than the preset matching degree threshold is greater than the preset number, if so, then the position and orientation of the charging pile is determined according to the structural data of the collected identifications.

In this embodiment, if the number of identifications on the potential charging piles or registered charging piles in the current short-range pile-searching connecting area is one, according to a preset pile-searching movement strategy, after the robot performs each movement in the short-range pile-searching connecting area, if the number of the matching degree of the potential or registered charging pile greater than the preset matching degree threshold is greater than the preset number, then the potential charging pile or registered charging pile is used as the charging pile waiting for connecting, thereby ensuring reliable confirmation of the charging pile and accurate determination of the position and orientation of the charging pile. For example, if the calculated number of the matching degree between the structural data of the identification on the present potential or registered charging pile and the structural data of the identification template greater than the preset threshold of matching degree is 6, and the preset number is 5, 6 is greater than 5, then the potential charging pile or registered charging pile is used as the charging pile waiting or connecting, otherwise the other charging piles to be connected can be searched again.

In step S3 of the embodiment of the method for charging robot according to the present invention, the structural data of the identifications on potential or registered charging piles are collected. If the matching degree between the structural data of the collected identifications and the pre-stored structure data of the identification template is greater than the preset matching degree threshold, the position and orientation of the charging pile can be determined based on the structural data of the collected identifications, includes:

if the number of the identifications on potential or registered charging piles in the current short-range pile-searching connecting area is more than one, the robot will make a preset number of movements in the short-range pile-searching connecting area, and collect the structural data of the identifications on each potential charging pile or registered charging pile after each movement; and calculate whether the matching degree between the structural data of the identifications on every potential charging pile or registered charging pile and if the structural data of the identification template is greater than the preset matching degree threshold, calculate whether the number of the matching degree of every potential charging pile or registered charging pile greater than the preset matching degree threshold is greater than the preset number, then select the potential charging pile or registered charging pile that the number is the largest and greater than the preset number to be the charging pile waiting for connecting. The position and orientation of the charging pile is determined according to the structural data of the collected identification on the charging pile waiting for connecting.

In this embodiment, if there are many identifications on the potential charging pile or registered charging piles in the current short-range pile-searching connecting area, then according to the preset pile-searching movement strategy, after every movement of the robot in the short-range pile-searching connecting area, the potential charging pile or the registered charging pile with the largest number of times and larger than the preset number is selected as the charging pile to be connected, thereby ensuring reliable confirmation of the charging pile and accurate determination of the position and orientation of the charging pile. For example, if the number of identifications on the current potential charging pile or registered charging pile is 3, the calculated times of the matching degree between the structural data of the identifications on the first potential or registered charging pile and the preset structural data of the identification template larger than the preset matching degree threshold is 6, the calculated number of the matching degree between the structural data of the identifications on the second potential or registered charging pile and the preset structural data of the identification template is larger than the preset matching degree threshold is 7, the calculated number of the matching degree between the structural data of the identifications on the third potential or registered charging pile and the preset structural data of the identification template larger than the preset matching degree threshold is 8; the preset number of times is 5; 6, 7 and 8 which are all larger than the preset number of times, the times of the matching degree of the third potential or registered charging pile is larger than the preset matching degree threshold is the largest, namely 8, then the third potential or registered charging pile is selected as the charging pile to be connected In step S1 of the embodiment of the method for charging robot according to the present invention, the current surrounding environment data of the moving robot is collected, including:

the current environment data of the moving robot are collected through one of infrared, camera, ultrasonic and laser acquisition apparatuses or any combination thereof.

In step S3 of the embodiment of the method for charging robot according to the present invention, the structural data of the identifications on potential or registered charging piles are collected, includes:

the structural data of the identifications on potential or registered charging piles are collected through one of infrared, depth camera, ultrasonic and laser acquisition apparatuses or any combination thereof.

In step S1 of the embodiment of the method for charging robot according to the present invention, collecting the current surrounding environment data of the robot during the movement of the robot, generate the environment map of the environment where the robot is and the position and orientation of the robot in the environment map according to the surrounding environment data, includes:

collecting the current surrounding environment data of the robot during the movement of the robot, collecting the data of the current moving distance and direction of the robot;

according to the current surrounding environment data and the data of moving distance and direction of the robot, generates the environment map of the environment where the robot is and the position and orientation of the environment map where the robot is.

In this embodiment, through the collection combining the current surrounding environment of the robot with the moving distance and direction, the environment map of the environment where the robot is and the position and orientation of the environment map where the robot is can be generated more accurately.

In step S4 of the embodiment of the method for charging robot of according to the present invention, the position and orientation of the robot in the environment map is adjusted according to the position and orientation of the charging pile, and the charging pile is connected to the robot for charging, including:

collecting the data of the moving distance and direction of the robot; and according to the position and orientation adjustment of the charging pile and the collected data of the moving distance and direction of the robot, the position and orientation of the robot in the environment map is adjusted, and the charging pile is connected to the robot for charging.

In this embodiment, through combining the position and orientation of the charging pile with the collected moving distance and direction of the robot, the position and orientation of the robot in the environment map can be adjusted more accurately, to precisely connecting the charging pile to the robot for charging.

In step S2 of the embodiment of the method for charging robot according to the present invention, according to the environment map and the position and orientation in the environment map, the robot moves to the short-range pile-searching connecting area near the position of the potential charging pile or registered charging pile, and includes:

according to the current environment map, the current position and orientation in the environment map and the potential or registered charging pile position, the global path of the movement of the robot is determined;

according to the global path, control the movement of the robot to the short-range pile-searching connecting area near the potential or registered charging pile position;

collect the current moving speed of the robot, adjust the local path of the global path and the running speed of the local path according to the current environment map, the current position and orientation of the robot in the environment map and the current moving speed of the robot, and obtain the smooth collision-free global path after adjustment; and according to the adjusted global path, the robot continues to move to the short-range pile-searching connecting area near the position of potential or registered charging pile.

Herein, according to the constantly updated current environment map and the current position and orientation of the robot of the environment map, combining the current speed information of the robot, the local path of the global path can be constantly adjusted, to produce smooth collision-free control decision, to ensure that in the returning process of the robot, due to the ability of realization of barrier avoidance in the change of the environment, like new barriers are added in the global path, the robot can achieve returning process.

Figure 3:
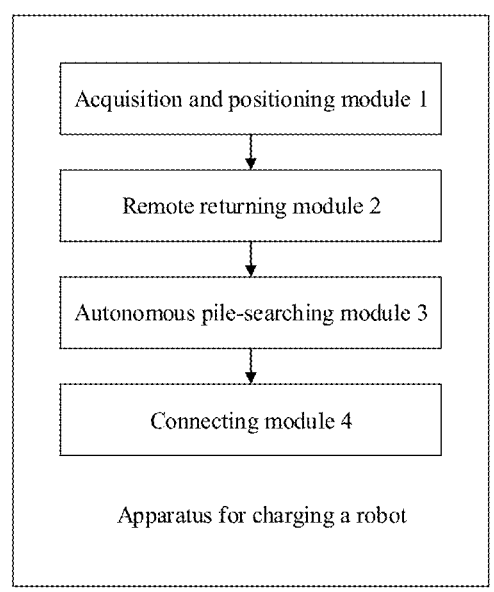
FIG. 3 is a module diagram of an apparatus for charging robot according to an embodiment of the invention.

As shown in FIG. 3, according to another aspect of the invention, an apparatus for charging robot is also provided, the apparatus includes:

acquisition and positioning module 1; the acquisition and positioning module is configured to collect the current surrounding environment data of the robot during the movement of the robot; according to the surrounding environment data, the environment map of the robot and the position and orientation of the robot in the environment map are generated; the environment map includes recorded charging pile positions, and the potential or registered charging pile positions;

remote returning module 2; the remote returning module is configured to move the robot to a short-range pile-searching connecting area near the potential or registered charging pile position according to the environment map and the position and orientation of the robot in the environment map;

autonomous pile-searching module 3; the autonomous pile-searching module is configured to collect the structural data of the identifications on potential or registered charging piles; if the matching degree between the structural data of the collected identification and the pre-stored structural data of the identification template is greater than the preset matching degree threshold, then the position and orientation of the charging pile is determined according to the structural data of the collected identifications; and connecting module 4; the connecting module is configured to adjust the position and orientation of the robot in the environment map according to the position and orientation of the charging pile and connect the charging pile to the robot for charging.

In an embodiment of the apparatus for charging the robot of the present invention, the connecting module, also configured for collecting the voltage of the moving robot after the charging pile is connected to the robot. If the collected voltage is not larger than the preset voltage threshold, then after moving the position of the short-range pile-searching connecting area, and after the moving robot moves to the short-range pile-searching connecting area, the autonomous pile-searching module and the connecting module execute respective operation repeatedly until the voltage collected by the connecting module is larger than the preset voltage threshold.

In an embodiment of the apparatus for charging robot of the present invention, the identification includes reflective material of at least one convex structure and reflective material of at least one concave structure of those, and at least one convex structure is connected to at least one concave structure, wherein the depth value between the convex structure and the concave structure is greater than the preset depth threshold.

In an embodiment of the apparatus for charging robot of the present invention, the acquisition and positioning module 1 is also configured for collecting the structural data of the passing object during the movement of the robot performing the task before collecting the current surrounding environment data of the robot on the move. If the matching degree between the structural data of the passing object and the pre-stored structural data of the identification template is greater than the preset matching degree threshold, then the passing object is recorded as a potential charging pile position.

In an embodiment of the apparatus for charging the robot of the present invention, the autonomous pile-searching module 3, is configured if the number of potential or registered identifications on the charging piles in the current short-range pile-searching connecting area is one, the robot will make a preset number of movements in the short-range pile-searching connecting area, and collect the structural data of the potential or registered identifications on the charging piles after each movement; calculate whether the matching degree between the collected structural data each time of the identification on a potential or registered charging pile and pre-stored structural data of the identification template is greater than the preset matching degree threshold, then determine whether the number of the calculated matching degree of the potential or registered charging piles is greater than the preset matching degree threshold is greater than the preset number, if so, then the position and orientation of the charging pile is determined according to the structural data of the collected identification.

In an embodiment of the apparatus for charging robot of the present invention, the autonomous pile-searching module 3 is configured for if the number of identifications on potential charging piles or registered charging piles in the current short-range pile-searching connecting area is more than one, the robot will make a preset number of steps of movement in the short-range pile-searching connecting area, and collect the structural data of the identifications on each potential or registered charging piles after each movement; calculate whether the matching degree between the structural data of the identification on every potential or registered charging pile and the structural data of the identification template is greater than the preset matching degree threshold, calculate whether the number of the matching degree of every potential or registered charging pile greater than the preset matching degree threshold is greater than the preset number, then select the potential charging pile or registered charging pile that the number of the matching degree being greater than the preset matching degree threshold is the largest and greater than the preset number to be the charging pile waiting for connecting. The position and orientation of the charging pile is determined according to the structural data of the collected identification on the charging pile waiting for connecting.

In an embodiment of the apparatus for charging the robot of the present invention, the acquisition and positioning module 1 is configured to collect the current environment data of the moving robot through one of infrared, camera, ultrasonic and laser acquisition apparatuses or any combination thereof.

In an embodiment of the apparatus for charging the robot of the present invention, the autonomous pile-searching module 3 is configured to collect the structural data of the identifications charging piles on potential or registered charging piles through one of infrared, depth camera, ultrasonic and laser acquisition apparatuses or any combination thereof.

In an embodiment of the apparatus for charging a robot of the present invention, the connecting module is configured to collect data of the moving distance and direction of the robot; according to the position and orientation adjustment of the charging pile and the collected data of the moving distance and direction of the robot, the position and orientation of the robot in the environment map is adjusted, and the charging pile is connected to the robot for charging.

In an embodiment of the apparatus for charging a robot of the present invention, the remote returning module 2 is configured to determine the global path of the movement of the robot according to the current environment map, the current position and orientation in the environment map and the potential or registered charging pile position; control the robot moves to the connecting area of the short-range searching pile near the potential charging pile position or registered charging pile position according to the global path; collect the current moving speed of the robot, adjust the local path of the global path and the running speed of the local path according to the current environment map, the current position and orientation in the environment map and the current moving speed of the robot, obtain the smooth collision-free global path after adjustment; the robot continues to move to the short-range pile-searching connecting area near the position of the potential or registered charging pile according to the adjusted global path.

Figure 4:
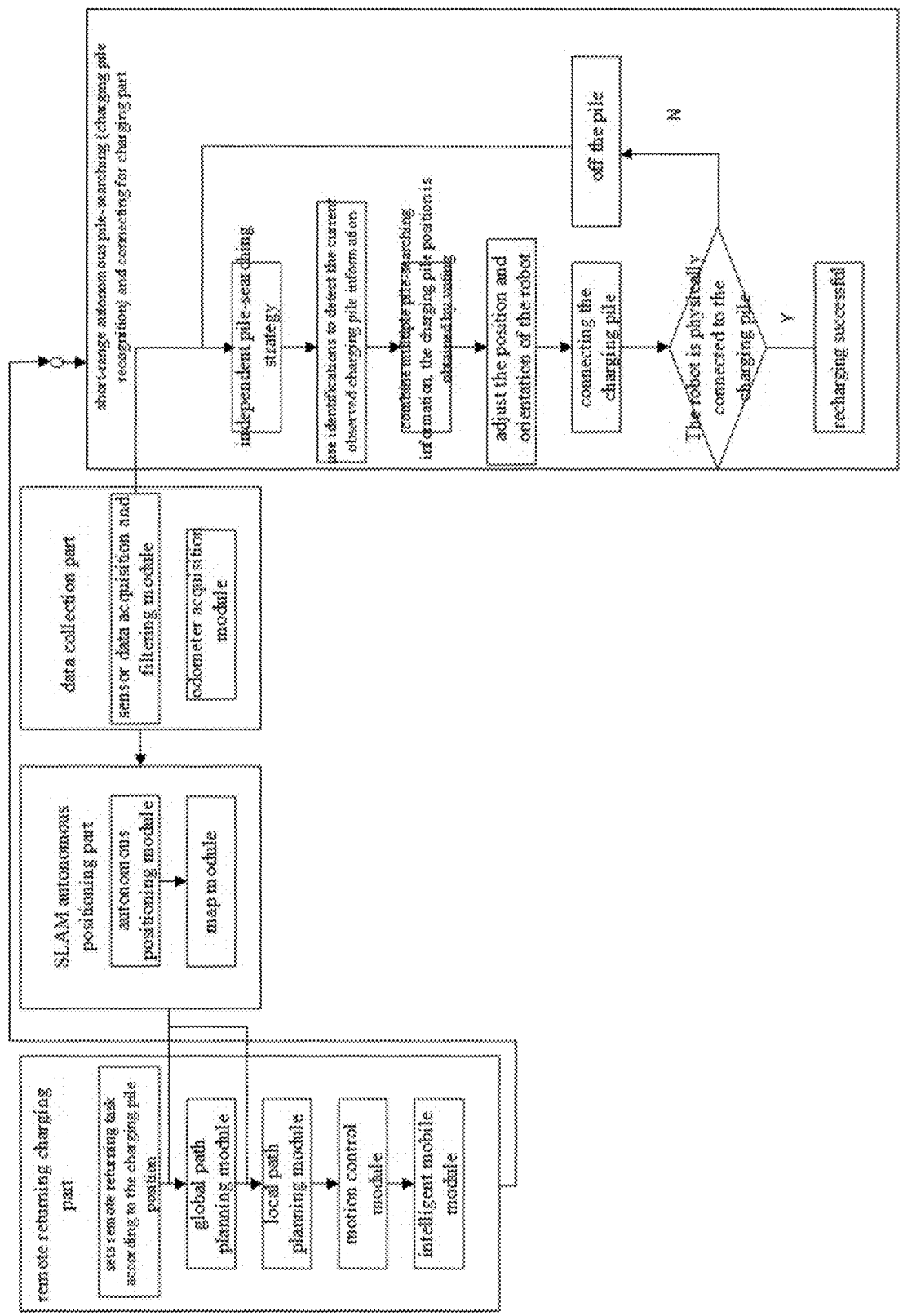
FIG. 4 is a schematic diagram according an embodiment of the invention.

As shown in FIG. 4, in a specific application embodiment of the present invention, the invention mainly includes four parts: SLAM (simultaneous localization and mapping) autonomous positioning part, data collection part, remote returning, short-range autonomous pile-searching (charging pile recognition) and connecting for charging.

One, SLAM autonomous positioning part: mainly configured for constructing the environment map, and the current position and orientation of the robot is obtained according to the map and observation information in real time. It mainly includes autonomous positioning module and map module:

1) map module: mainly uses SLAM related algorithm, constructs the environment map. The map can be used for global path planning and autonomous positioning module, is the core module in the intelligent mobile algorithm, wherein, SLAM (simultaneous localization and mapping), is also called CIVIL (Concurrent Mapping and Localization), or parallel mapping and localization;

2) autonomous positioning module: based on the current sensor information, combines the environment map to construct the storage module, uses related matching algorithm, requires the current position and orientation information, to make the robot know the position and orientation of its own in the environment in real time.

Two, data collection part: is mainly used for the acquisition of the current environment data of the robot during the movement of the robot and the odometer data (the current moving distance of the direction of the robot), and provides data support for the operation of other modules. It is mainly composed of the sensor data acquisition and filtering module and the odometer acquisition module:

1) the sensor data acquisition and filtering module: collects intelligent device configuration sensor data, using relevant filtering algorithm to remove excess noise points of excess measurement data in the current surrounding environment data in motion;

2) the odometer acquisition module: obtains the intelligent device mileage data (the current moving distance and direction of the robot), provides a priori knowledge for the autonomous positioning module, and judges the pile-to-point and the rotation angle when the robot is connected to the charging pile.

Three, remote returning charging: the main purpose is to move the robot to the position near the potential or registered charging pile position according to the environmental map and the position and orientation information of the robot, avoids finding the wall blindly, randomly walk to find the charging pile, solves the problem of long returning time in complex indoor environment, and speed up the efficiency of recharging. It is mainly realized by the components of the recharge navigation task setting, the global path planning module, the local path planning module, the motion control module and the intelligent mobile module. The functions of the above components are as follows:

1) recharge navigation task setting: sets remote returning task according to the potential or registered charging pile position and the current position and orientation of the robot;

2) the global path planning module: according to the tasks issued by the recharge navigation task setting and autonomous positioning module information, combines with the heuristic search algorithm, uses the environment map, searches the global collision-free optimal path from starting point (the current position and orientation of the robot) to the end point (potential charging pile position), guides the smart device to complete the set returning task;

3) the local path planning module: In the process of returning, due to changes in the environment, a local planning module is required to make the system have certain barriers avoidance capability, to accomplish the returning task. The module utilizes multi-sensor fusion data and the current global path, and the autonomous positioning information, combines with the current speed information of the robot, uses the dynamic window algorithm to generate smooth collision-free control decisions;

4) the motion control module: uses the global path planning module and the local path planning module to generate collision-free control decisions, combines with the intelligent device motion model to generate motion control decisions;

5) the intelligent mobile module: receives motion control decision of motion control module, controls the device to move without collision.

Four, short-range autonomous pile-searching (charging pile recognition) and connecting for the charging part: after the robot moves to the short-range pile-searching connecting area, the charging pile identification is performed for the structural data of the current identification of the potential or registered charging pile, and combines with the set structural data of the identification template of the charging pile. When the collected structural data of the identification on the potential or registered charging pile and the identification template structure satisfy a certain matching degree, the candidate charging pile can be identified, and the pile-searching movement strategy is designed, the potential charging pile of the highest probability is used as the final charging pile position is selected according to the multi-frame statistical data, the position and orientation of the robot relative to the charging pile is adjusted in real time, and the connecting charging is implemented. It mainly consists of the independent pile-seeking module, the identification structure based short-range charging pile identification module, the position and orientation adjustment and connecting charging pile module, the charging pile physical connection confirmation module:

1) the independent pile-seeking module: designs independent pile-searching strategy. In the short-range pile-searching connecting area, sets the robot's motion strategy (moving, rotating or other means) to increase the pile-searching probability;

2) the identification structure based short-range charging pile identification module: according to the charging pile identification structure, when the structural data of the identification on the potential or registered charging pile and the identification template structure satisfies a certain matching degree, the candidate charging can be identified, and can determine the current observation candidate set of the charging piles and its position information, combines with multi-frame detection information, and according to the charging pile position and orientation information of the candidate set, perform statistics, each time a certain candidate charging pile is observed, then the probability correspondingly increases, when the probability of observing a candidate charging pile is greater than the set probability, then the target charging pile is found, and the relative position and orientation of the target charging pile is obtained;

3) the connecting charging pile module: according to the position and orientation of the robot and the relative position and orientation of the target charging pile, adjusts the position and orientation of the robot to perform connecting of the charging pile;

4) the charging pile physical connection confirmation module: monitors the connection voltage of the robot to determine whether the electrical connection is successful, so as to determine the physical connection between the robot and the charging pile.

According to another aspect of the invention, a computing-based device is also provided, the device includes:

a processor; and a memory arranged to store computer executable instructions, when the executable instructions being executed, the processor:

collects the current surrounding environment data of the robot during the movement of the robot, generates the environment map of the environment the robot is in and the position and orientation of the robot in the environment map according to the surrounding environment data, and the environment map includes the recorded potential charging piles or registered charging piles positions;

according to the environment map and the position and orientation of the robot in the environment map, move the robot to the short-range pile-searching connecting area near the position of potential charging piles or registered charging pile;

collects the structural data of the identifications on the potential charging piles or registered charging piles. If the matching degree between the structural data of the collected identification and the pre-stored structural data of the identification template is greater than the preset matching degree threshold, and determines the position and orientation of the charging piles according to the structural data of the collected identification; and adjusts the position and orientation of the robot in the environment map is adjusted according to the position and orientation of the charging pile, and the charging pile is connected to the robot for charging.

In the present invention, the specific contents of the embodiments of the Apparatus for charging the robot and the computing-based device can refer to the corresponding contents of the method for charging the robot, and are not repeatedly described.

To sum up, the present invention moves the robot to the position near a potential or registered charging pile or registered charging pile according to the environment map and the robot self-positioning information which is the position and orientation of the robot in the environment map, avoid finding walls blindly, random walk for finding charging pile, avoid the long returning time caused by complex indoor environment, and does not need to have a certain ability to distinguish walls and island barriers, to speed up the recharging efficiency. When the robot moves to short-range pile-searching connecting area, the present invention can use acquisition apparatuses such as laser to carry out line extraction of the structural data of the identification, and combine with the preset structural data of the identification template, to carry out the recognition of the charging pile; after the structural data of the collected identification and the structural data of the identification template satisfies the preset matching degree, then the charging pile can be connected to the robot for charging; confirm the physical connection according to the voltage condition after the robot is connected to the charging pile to ensure correct charging behavior. The invention can realize accurate recognition of charging pile, is highly efficient and reliable, and effectively overcomes a series of behaviors of pile jitter, interference and misrecognition caused by sensitive hardware characteristics and environmental interference in existing technologies.

It will be apparent to those skilled in the art that various modifications and variations can be made in the present application without departing from the spirit and scope of the application. Thus, if modifications and variations of this application belong to the claims of this application and the scope of the equal technology, then it is intended that the modifications and variations are covered by the application.

It should be noted that the present invention can be implemented in software and/or a combination of software and hardware, for example, using an application specific integrated circuit (ASIC), a general purpose computer, or any other similar hardware device. In an embodiment, the software program of the present invention could be executed by a processor to implement the steps or functions described above. Likewise, the software program (including related data structures) of the present invention can be stored in a computer readable recording medium such as a RAM memory, a magnetic or optical drive or a floppy disk and the like. Additionally, some of the steps or functions of the present invention may be implemented by hardware, for example, as a circuit that cooperates with a processor to perform various steps or functions.

Additionally, a portion of the invention can be applied as a computer program product, such as computer program instructions, which, when executed by a computer, can invoke or provide a method and/or solution in accordance with the invention through the operation of the computer. The program instructions for invoking the method of the present invention may be stored in a fixed or removable recording medium and/or transmitted by a data stream in a broadcast or other signal bearing medium, and/or stored in a working memory of the computer device in which the program instructions are run. Herein, an embodiment in accordance with the present invention includes an apparatus including a memory for storing computer program instructions and a processor for executing program instructions, wherein when the computer program instructions are executed by the processor, the apparatus operating based on the foregoing methods and/or technical solutions in accordance with various embodiments of the present invention are triggered.

It is obvious to those skilled in the art that the present invention is not limited to the details of the above-described exemplary embodiments, and the present invention can be realized in other specific forms without departing from the spirit or essential characteristics of the invention. Therefore, no matter varying points of view, the present embodiments are to be considered as illustrative and not restrictive, and the scope of the invention is defined by the appended claims instead of the above specifications, therefore all changes in the meaning and scope of equivalent elements are included in the present invention. Any reference signs in the claims should not be construed as limiting the claim involved. In addition, it is to be understood that the word "comprising" does not exclude other elements or steps, the singular does not exclude the plural. A plurality of units or apparatuses recited in the apparatus claims may also be implemented by a unit or an apparatus by software or hardware. The terms of first, second, etc. are used to denote names and do not denote any particular order.

What is claimed is:

1. A method for charging a robot, comprising:

collecting current surrounding environment data of a robot during movement of the robot, generating an environment map of the current surrounding environment the robot is in and a position and orientation of the robot in the environment map according to the current surrounding environment data, and the environment map comprising recorded positions of potential or registered charging piles;

according to the environment map and the position and orientation in the environment map, moving the robot to a short-range pile-searching connecting area near position of potential charging piles or registered charging piles;

collecting structural data of identifications on the potential charging piles or the registered charging piles; if a matching degree between the structural data of the identification and pre-stored structural data of an identification template is greater than a preset matching degree threshold, determining position and orientation of a charging pile of the potential or registered charging piles according to the structural data of the identification; and adjusting the position and orientation of the robot in the environment map according to the position and orientation of the charging pile, and connecting the charging pile to the robot for charging.

2. The method according to claim 1, wherein, after the charging pile is connected to the robot for charging, the method further comprises:

collecting a voltage of the robot after the charging pile connecting to the robot; if the voltage does not exceed a preset voltage threshold, moving the short-range pile-searching connecting area, and after the moving robot moves to the short-range pile-searching connecting area, repeating the following steps until the voltage exceeds the preset voltage threshold;

collecting the structural data of the identifications on charging piles; if the matching degree between the structural data of the identification and the pre-stored structural data of the identification template is greater than the preset matching degree threshold, determining the position and orientation of the charging pile according to the structural data of the collected identifications;

adjusting the position and orientation of the robot in the environment map according to the position and orientation of the charging pile, and the charging pile being connected to the robot for charging; and collecting the voltage of the robot after the charging pile connected to the robot.

3. The method according to claim 1, wherein, the identification comprises reflective material of at least one convex structure and reflective material of at least one concave structure, and the least one convex structure is connected to the at least one concave structure, wherein a depth value between the convex structure and the concave structure is greater than a preset depth threshold.

4. The method according to claim 1, wherein, before collecting the current surrounding environment data of the robot during the movement of the robot, further comprises:

during the movement of the robot performing a task, collecting the structural data of a passing object; if a matching degree between the structural data of the passing object and the pre-stored structural data of the identification template is greater than the preset matching degree threshold, then recording the passing object as a potential charging pile position.

5. The method according to claim 1, wherein, collecting the structural data of the identifications on the potential or registered charging piles; if the matching degree between the structural data of the identification and the pre-stored structural data of the identification template greater than the preset matching degree threshold, then determining the position and orientation of the charging pile of the potential or the registered charging piles according to the structural data of the identification, comprises:

if a number of identifications on the potential or registered charging piles in the short-range pile-searching connecting area is one, the robot makes a preset number of movement in the short-range pile-searching connecting area, and collecting the structural data of the potential or registered identifications on the charging piles after each movement; and calculating whether the matching degree between the structural data collected every time of an identification on one of the potential or registered charging piles and pre-stored structural data of identification template is greater than the preset matching degree threshold, then determining whether the number of the matching degree of the potential or registered charging piles greater than the preset matching degree threshold is greater than a preset number, if so, then determining the position and orientation of the charging pile according to the structural data of the identifications.

6. The method according to claim 1, wherein, collecting the structural data of the identifications on the potential or registered charging piles; if the matching degree between the structural data of the identifications and the pre-stored structure data of the identification template is greater than the preset matching degree threshold, determining the position and orientation of the charging pile according to the structural data of the identifications, comprises:

if a number of the identifications on the potential or registered charging piles in the short-range pile-searching connecting area is more than one, the robot makes a preset number of movement in the short-range pile-searching connecting area, and collecting the structural data of the identifications on each of the potential or registered charging piles after each movement; and calculating whether the matching degree between the structural data of the identifications on every potential or registered charging piles and the structural data of the identification template is greater than the preset matching degree threshold, calculating whether a number of the matching degree of every potential or registered charging piles greater than the preset matching degree threshold is greater than a preset number, then selecting a potential or registered charging pile that the number is the largest and greater than the preset number of the matching degree greater than the preset matching degree threshold to be the charging pile waiting for connecting; determining a position and orientation of the charging pile according to the structural data of the identification on the charging pile waiting for connecting.

7. The method according to claim 1, wherein collecting the current surrounding environment data of the moving robot, comprises:

collecting the current environment data of the robot through one of infrared, camera, ultrasonic and laser acquisition apparatuses or any combination thereof.

8. The method according to claim 1, wherein, collecting the structural data of the identifications on the potential or registered charging piles, comprises:

collecting the structural data of the identifications on the potential or registered charging piles through one of infrared, depth camera, ultrasonic and laser acquisition apparatuses or any combination thereof.

9. The method according to claim 1, wherein, adjusting the position and orientation of the robot in the environment map according to the position and orientation of the charging pile, and connecting the charging pile to the robot for charging, comprises:
collecting data of a moving distance and a direction of the robot; and
according to a position and orientation adjustment of the charging pile and the data of the moving distance and the direction of the robot, adjusting the position and orientation of the robot in the environment map, and connecting the charging pile to the robot for charging.

10. The method according to claim 1, wherein, according to the environment map and the position and orientation in the environment map, moving the robot to the short-range pile-searching connecting area near the position of the potential or registered charging pile, comprises:
according to the environment map, the position and orientation of the robot in the environment map and the position of the potential or registered charging pile, determining a global path of the movement of the robot;
according to the global path, controlling the movement of the robot to the short-range pile-searching connecting area near the position of the potential or registered charging pile;
collecting data of a moving speed of the robot, adjusting a local path of the global path and a running speed of the local path according to the environment map, the position and orientation of the robot in the environment map and the moving speed of the robot, and obtaining a smooth collision-free global path after adjustment; and
according to the smooth collision-free global path, the robot continues to move to the short-range pile-searching connecting area near the position of the potential or registered charging pile.

11. An apparatus for charging robot, comprising:
acquisition and positioning module; wherein the acquisition and positioning module is configured to collect current surrounding environment data of a robot during movement of the robot; according to the surrounding environment data, an environment map of the robot and a position and orientation of the robot in the environment map are generated; the environment map includes recorded positions of potential or registered charging piles;
remote returning module; wherein the remote returning module is configured to move the robot to a short-range pile-searching connecting area near the positions of the potential or registered charging piles according to the environment map and the position and orientation of the robot in the environment map;
autonomous pile-searching module; wherein the autonomous pile-searching module is configured to collect structural data of identifications on the potential or registered charging piles; if a matching degree between the structural data of the identifications and pre-stored structural data of an identification template is greater than a preset matching degree threshold, then position and orientation of a charging pile of the potential or registered charging piles is determined according to the structural data of the identifications; and
connecting module; wherein the connecting module is configured to adjust the position and orientation of the robot in the environment map according to the position and orientation of the charging pile and connect the charging pile to the robot for charging.

12. The apparatus according to claim 11, wherein, the connecting module, is further configured for collecting a voltage of the robot after the charging pile is connected to the robot; if the voltage is not larger than a preset voltage threshold, then after moving position of the short-range pile-searching connecting area, and after the moving robot moves to the short-range pile-searching connecting area, the autonomous pile-searching module and the connecting module execute operation repeatedly until the voltage collected by the connecting module is larger than the preset voltage threshold.

13. The apparatus according to claim 11, wherein, the identifications include reflective material of at least one convex structure and reflective material of at least one concave structure of those, and the least one convex structure is connected to the at least one concave structure, wherein a depth value between the convex structure and the concave structure is greater than a preset depth threshold.

14. The apparatus according to claim 11, wherein, the acquisition and positioning module, is further configured for collecting the structural data of a passing object during the movement of the robot performing a task and before collecting the current surrounding environment data of the robot during the movement of the robot, collecting structural data of the passing object; if a matching degree between the structural data of the passing object and the pre-stored structural data of the identification template is greater than the preset matching degree threshold, then the passing object is recorded as a potential charging pile position.

15. The apparatus according to claim 11, wherein, the autonomous pile-searching module, is configured for if a number of potential or registered identifications on the charging piles in the short-range pile-searching connecting area is one, the robot makes a preset number of movement in the short-range pile-searching connecting area, and collect the structural data of the identifications on the potential or registered charging piles after each movement; calculate whether a matching degree between the structural data collected each time of an identification on one of the potential or registered charging piles and pre-stored structural data of the identification template is greater than the preset matching degree threshold, then determine whether a number of the matching degree of the potential or registered charging piles greater than the preset matching degree threshold is greater than a preset number, if so, then the position and orientation of the charging pile is determined according to the structural data of the identifications.

16. The apparatus according to claim 11, wherein, the autonomous pile-searching module, is configured for if a number of the identifications on potential or registered charging piles in the short-range pile-searching connecting area is more than one, the robot makes a preset number of movement in the short-range pile-searching connecting area, and collect the structural data of the identifications on each of the potential or registered charging piles after each movement; calculate whether the matching degree between the structural data of the identification on every potential or registered charging pile and the structural data of the identification template is greater than the preset matching degree threshold, calculate whether a number of the matching degree of every potential or registered charging pile greater than the preset matching degree threshold is greater than a preset number, then select the potential or registered charging pile that the number is the largest and greater than the preset number of the matching degree greater than the preset matching degree threshold to be a charging pile waiting for connecting; the position and orientation of the charging pile is determined according to the structural data of the identification on the charging pile waiting for connecting.

17. The apparatus according to claim 11, wherein, the acquisition and positioning module is configured to collect the current environment data of the robot through one of infrared, camera, ultrasonic and laser acquisition apparatuses or any combination thereof.

18. The apparatus according to claim 11, wherein, the autonomous pile-searching module is configured to collect the structural data of the identifications on the potential or registered charging piles through one of infrared, depth camera, ultrasonic and laser acquisition apparatuses or any combination thereof.

19. The apparatus according to claim 11, wherein, the connecting module is configured to collect data of a moving distance and a direction of the robot; according to a position and orientation adjustment of the charging pile and the data of the moving distance and the direction of the robot, the position and orientation of the robot in the environment map is adjusted, and the charging pile is connected to the robot for charging.

20. The apparatus according to claim 11, wherein, the remote returning module is configured to determine a global path of the movement of the robot according to the environment map, the position and orientation of the robot in the environment map and the positions of the potential or registered charging piles; according to the global path, control the robot moves to the short-range searching pile connecting area near the positions of the potential or registered charging piles; collect a moving speed of the robot, adjust a local path of the global path and a running speed of the local path according to the environment map, the position and orientation of the robot in the environment map and the moving speed of the robot, obtain a smooth collision-free global path after adjustment; according to the smooth collision-free global path, the robot continues to move to the short-range pile-searching connecting area near the position of the potential or registered charging pile.

21. A computing-based device, comprising:
a processor; and
a memory arranged to store computer executable instructions, wherein when the computer executable instructions is executed, the processor:
collects current surrounding environment data of a robot during the movement of the robot, generates an environment map of the current surrounding environment the robot is in and a position and orientation of the robot in the environment map according to the surrounding environment data, and the environment map includes recorded positions of potential or registered charging piles;
according to the environment map and the position and orientation of the robot in the environment map, moves the robot to a short-range pile-searching connecting area near the positions of the potential or registered charging piles;
collects structural data of identifications on the potential or registered charging piles; if a matching degree between the structural data of the identification and a pre-stored structural data of an identification template is greater than a preset matching degree threshold, determines position and orientation of a charging pile of the potential charging piles or the registered charging piles according to the structural data of the identification; and
adjusts the position and orientation of the robot in the environment map according to the position and orientation of the charging pile, and the charging pile is connected to the robot for charging.

* * * * *